US008023971B2

(12) United States Patent
Egli

(10) Patent No.: US 8,023,971 B2
(45) Date of Patent: Sep. 20, 2011

(54) METHOD AND SYSTEM TO DELIVER MULTIMEDIA ALERTS TO A MOBILE PHONE

(75) Inventor: Paul Andrew Mietz Egli, Santa Cruz, CA (US)

(73) Assignee: Syniverse ICX Corporation, Tampa, FL (US)

( * ) Notice: Subject to any disclaimer, the term of this patent is extended or adjusted under 35 U.S.C. 154(b) by 540 days.

(21) Appl. No.: 11/284,578

(22) Filed: Nov. 21, 2005

(65) Prior Publication Data
US 2007/0118608 A1 May 24, 2007

(51) Int. Cl.
*H04W 4/00* (2009.01)
(52) U.S. Cl. ........................................ 455/466
(58) Field of Classification Search .... 455/412.1–414.4, 455/466, 404.1; 705/51; 709/206, 237
See application file for complete search history.

(56) References Cited

U.S. PATENT DOCUMENTS

| 6,678,361 | B2 * | 1/2004 | Rooke et al. | 455/412.1 |
| 6,956,832 | B1 * | 10/2005 | Muhonen et al. | 709/206 |
| 2002/0078228 | A1 * | 6/2002 | Kuisma et al. | 709/237 |
| 2002/0194305 | A1 * | 12/2002 | Sadeghi et al. | 709/218 |
| 2003/0232616 | A1 * | 12/2003 | Gidron et al. | 455/406 |
| 2005/0064852 | A1 * | 3/2005 | Baldursson | 455/414.2 |
| 2006/0003741 | A1 * | 1/2006 | Becker et al. | 455/412.2 |
| 2006/0168003 | A1 * | 7/2006 | Vau et al. | 709/206 |
| 2007/0005613 | A1 * | 1/2007 | Singh et al. | 707/100 |

* cited by examiner

*Primary Examiner* — Lester Kincaid
*Assistant Examiner* — Steven Lim
(74) *Attorney, Agent, or Firm* — Blakely, Sokoloff, Taylor & Zafman LLP; Judith A. Szepesi

(57) ABSTRACT

A method and system for transferring content to a communication device or other destination are described. In one embodiment, the system comprises a subscription service to create and store subscriptions to a channel; a channel queue to obtain a multimedia message associated with the channel; and a delivery engine to cause an alert notification containing the multimedia message to be delivered to an eligible subscriber's mobile phone.

22 Claims, 7 Drawing Sheets

METHOD AND SYSTEM TO DELIVER MULTIMEDIA ALERTS TO A MOBILE PHONE

FIELD OF THE INVENTION

The present invention relates generally to systems and methods for transferring content between electronic devices and, more specifically, to a method and system to transfer multi media alerts to a mobile phone.

BACKGROUND

Mobile phone usage has reached the point where the majority of people in developed nations own one. Many people today have access to information via a personal computer or other Web-enabled device and also own a cell phone or personal digital assistant (PDA). Modern mobile phones are loaded with a variety of features such as a digital camera, messaging features, and an ability to download and playback multimedia files, in addition to more traditional features such as storing the user's address book or a contact list.

Some providers offer alerts service that allows mobile phone users to receive emails or text messages on their mobile phone notifying them, for example, of local events, weather forecast, or business news. Text messages are typically SMS messages. SMS, Short Message Service, usually refers to wireless alphanumeric text messages sent to a mobile phone. While a mobile phone user may be interested in viewing particular content in multimedia format, the alerts are delivered to the user's mobile phone as text messages.

With the advent in the versatility of the mobile phones it is becoming more and more desirable for a user to be able to subscribe to and receive alerts in a multimedia format.

SUMMARY

A method and system are provided for transferring content to a communication device or other destination, the system comprises a subscription service to create and store subscriptions to a channel; a channel queue to obtain a multimedia message associated with the channel; and a delivery engine to cause an alert notification containing the multimedia message to be delivered to an eligible subscriber's mobile phone.

Other aspects of the invention will be apparent from the accompanying figures and from the detailed description that follows.

BRIEF DESCRIPTION OF THE DRAWINGS

The present invention is illustrated by way of example, and not limitation, in the figures of the accompanying drawings in which.

DETAILED DESCRIPTION

Figure 1:
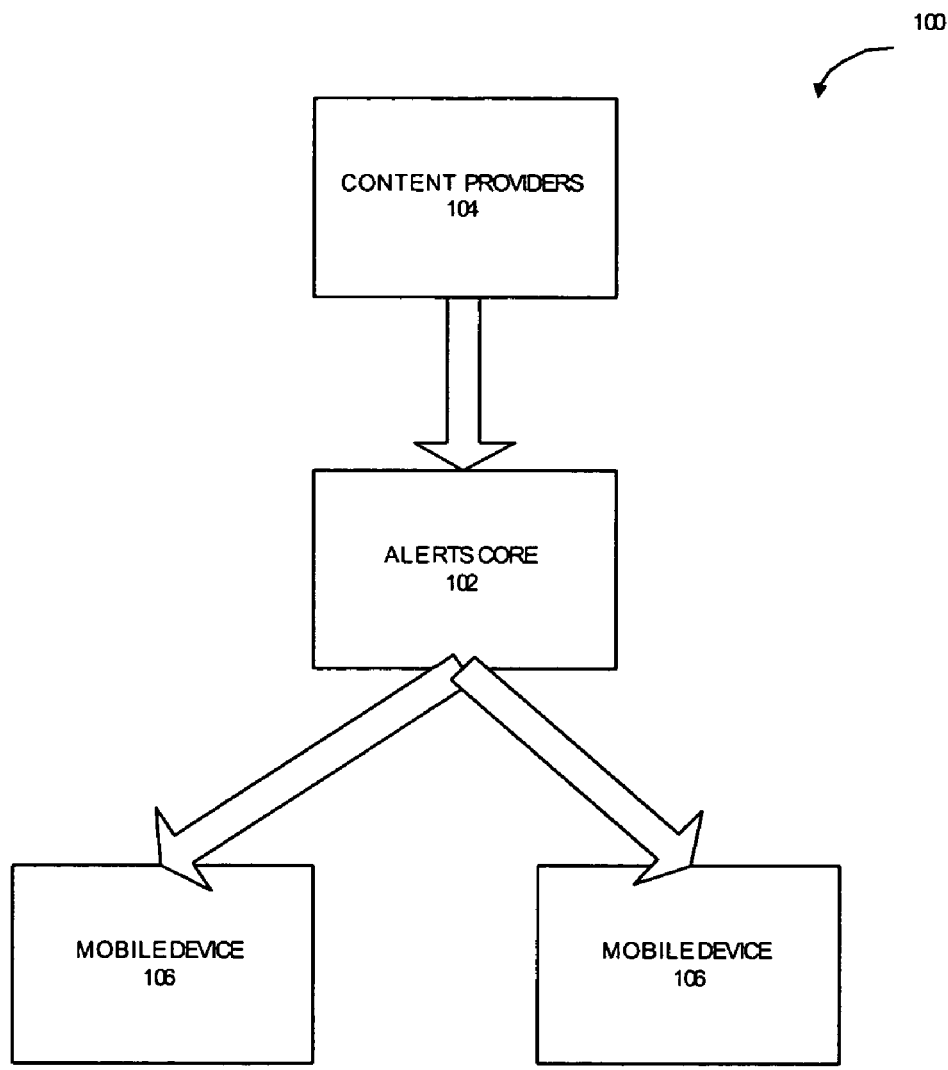
FIG. 1 is a schematic block diagram of a network environment within which the present invention may be implemented, according to one illustrative embodiment.

In one illustrative embodiment, the present invention provides a method and system for permitting a user to receive, at the user's mobile phone, multimedia alert notifications. Alert notifications (or simply alerts) are typically text or media messages that are designated to be delivered to one or more end users through an alerts service. Mobile phone users may subscribe to an alerts service via a subscriptions website. A subscriptions web site may list topics of interest (or categories), such as news, sports, business, entertainment, and weather. Each of these categories may, in turn, have sub categories. For example, the sports category may have baseball, football, and basketball subcategories. Related topics (e.g., sub categories) may be grouped to define a channel, so that a user may be permitted to subscribe to a channel in order to receive associated alerts when new information related to the selected channel is available from a content provider. Alternatively, a user may subscribe to channels using a mobile originated (MO) instead of a subscriptions website. The MO service may be in the form of a "conversation" between the user and the service that takes place via SMS messages.

In one embodiment, a user may specify delivery options for selected alerts, such as day and time of delivery, frequency of delivery, alert keywords, and maximum number of messages per day. The association of an end user with a channel and a set of delivery options may be termed a subscription.

It will be noted that a system for providing multimedia alerts to a mobile phone is capable of acquiring alert content from a variety of sources. The system provides a "pluggable" service provider interface for extending the number and type of acquisition processes. An alerts system may be capable, in one embodiment, to interface with a variety of content providers and to receive various content feeds. For example, the system may be capable of pulling various Extensible Markup Language (XML) files into the system. The system may read custom XML files or XML files in standard formats such as Rich Site Summary (RSS). In some embodiments a provider may send to the alerts system a Uniform Resource Locator (URL) pointing to a location from where a multimedia message may be retrieved. The alerts core system may be configured to retrieve multimedia alert messages utilizing the provided URL and assemble a multimedia alert notification based on their retrieve multimedia message. In some embodiments, the alerts core system may be able to retrieve multimedia alert messages from email accounts using the Post Office Protocol (POP3). In some embodiments, the alerts core system may be able to retrieve multimedia alert messages from news feeds using the Network News Transfer Protocol (NNTP).

In one embodiment, subscription delivery is decoupled from the content providers' feeds into the alerts system. For example, when information from a content provider becomes available, the message containing the information may be enqueued by the alerts system in a channel queue and designated for delivery, possibly at a later time, according to the subscriber's delivery settings. In operation, according to one illustrative embodiment, the alerts system periodically processes the subscriptions to identify eligible subscribers, retrieves available alerts from a content database, merges the content with the list of eligible subscribers, and sends the alert notifications to be delivered to the eligible subscribers. In one embodiment, an alerts core system identifies a subscriber to a channel as an eligible subscriber if there is at least one unsent message from the channel in the channel queue and the subscriber should be receiving the message according to the subscriber's delivery options.

In one embodiment, subscription delivery is directly coupled to the content providers' feeds into the alerts system. For example, when time-sensitive information from a content provider becomes available, a message containing the information may be enqueued for priority delivery to the subscriber.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Referring first to FIG. 1, a network diagram illustrates a system 100 to provide multimedia alerts to a mobile phone. The system 100 comprises, in one embodiment, an alerts system 102 to obtain multimedia messages from content providers 104 and to send alert notifications containing multimedia messages to users' mobile communication devices 106 (e.g., mobile phones). Content providers 104 are one or more external companies or entities that generate or assemble text and media messages that the alerts core can use to create alert notifications. In addition to acting as the source of the raw material (e.g., messages) for constructing alert notifications, content providers 104 may annotate their material to indicate related content.

A mobile communication device 106 may interact with and receive feedback from the alerts system 102 using various different communication devices and/or protocols, for example Wireless Application Protocol (WAP) or SMS.

Figure 2:
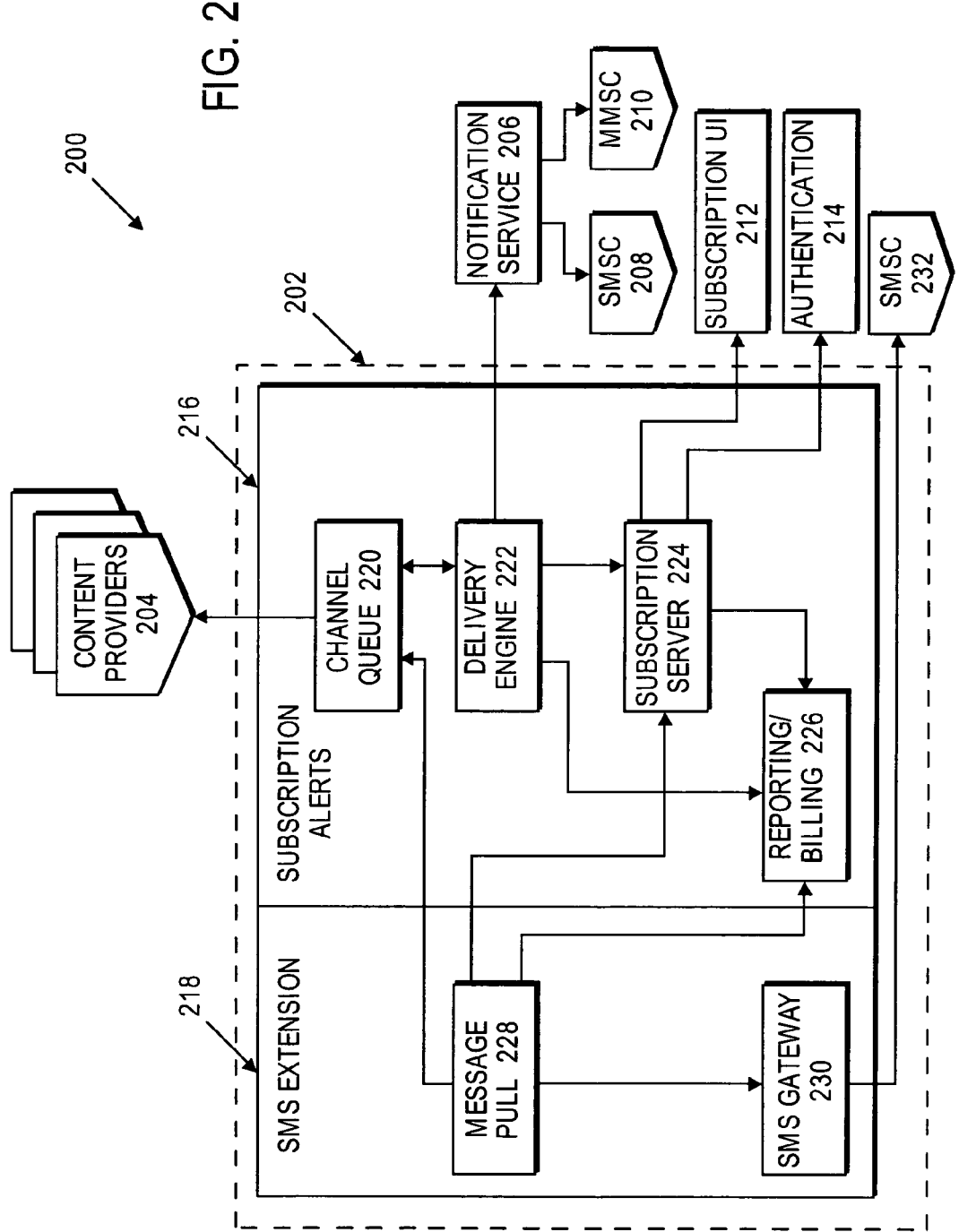
FIG. 2 illustrates a block diagram of an alerts system, according to one embodiment of the present invention.

FIG. 2 shows exemplary components of an alerts system 200. The alerts system 200 comprises, in one embodiment, an alerts core 202 in communication with content providers 204, with subscription user interface (UI) 212, with an authentication component 214, and with a notification service 206. The notification service 206, in one embodiment, is in communication with a short message service center (SMSC) 208 and a multimedia service center (MMSC) 210. The subscription UI 212 may be configured to communicate with the alerts core 202 via WAP. The notification service 206, may be utilized to abstract the task of delivering multimedia, SMS, and push access protocol (PAP) messages. It will be noted, that various components of the alerts system 200 may be distributed across several servers. For example, a web application with the associated UI 212 may be deployed on a server separate from a server running the notification service 206.

The alerts core 202, in one embodiment, comprises two functional units: a subscription alerts unit 216 and an SMS extension component 218. The subscription alerts unit 216 is responsible for accepting content such as multimedia messages from content providers 204, maintaining end user subscriptions to channels, and delivering alert notifications containing multimedia messages from the provider to the end user's mobile phone. The SMS extension 218 provides a facility to end users for requesting content (e.g., via a message pull component 228) and for subscribing to channels via two-way SMS conversations (e.g., utilizing SMS gateway 230). The SMS gateway, in one embodiment, may communicate with an SMSC 232. The SMSC 232 may be, in one embodiment, a separate service center, as well as the same service center as the SMSC 208.

The alerts core 202, in one embodiment, includes a channel queue 220, a delivery engine 222, and a subscription service component 224. The alerts core 202 may further include a reporting and billing component 226 to keep track of alerts services provided to a particular subscriber.

As noted above, alert messages may be transmitted from the providers 204 to the alerts system 202 (in a push mode) or, alternatively, a provider may instruct the alerts system 202 to contact a particular service associated with the provider in order to fetch messages (in a pull mode) at predetermined times. When the format of alert messages is defined by a provider, the alerts system 202 may be utilized to normalize the acquisition and format of messages before the messages are processed and delivered to subscribers via the notification service 206. In one embodiment of the present invention, a content provider service provider interface (SPI) may be implemented. A specific SPI implementation may be registered with the alerts system 202. The alerts system 202 may call the SPI implementation in order to acquire messages from the content provider.

The alerts system 202, in one embodiment, maintains an absolute validity period for each alert message, during which the message is eligible for delivery to subscribers (e.g., and via any subscriber "pull" interface). While a message is valid, it may be stored in the alerts system 202, e.g., in a content database. The content database may be associated with and reside on the same server as the channel queue 220, or, alternatively, the content database may reside on a dedicated database server. The channel queue 220 may be configured to remove messages whose validity period has expired.

The alerts core 200, in one embodiment, depends on external services like SMSCs 208 and MMSCs 210 for delivery of alert messages to subscriber's mobile phones. These services might not be continually available. In order to ensure delivery of alert messages, the alerts core 200 may be configured to hold messages during outages of the services on which it depends. Many alert messages must be delivered within a specific time period and not delivered after that period has elapsed according to the subscriber's delivery preferences. The delivery engine 222 may be configured to ensure that messages are not sent outside of the subscriber's preferred delivery windows.

Providers may send customized or personalized content that is designated for delivery to a particular group of end users. The content provider SPI, in one embodiment, may be configured to identify these types of messages and send them directly to the delivery engine 222 for processing.

The subscription component 224 of the alerts core 202 may be configured to maintain various subscriptions. A subscription may be defined as the relationship between a user (a subscriber), a channel, and a set of delivery options. The subscription component 224 may include a subscription API and a set of methods suitable for building web-based user interfaces for creating, retrieving, updating, and deleting subscriptions and subscribers. In addition to providing back end service for the alerts system user interface, the subscription component 224 may be used by the delivery engine 222 to retrieve lists of subscriptions for delivery to users. The subscription component 224 may, in one embodiment include database tables for storing subscriptions. In an alternative embodiment, the database tables for storing subscriptions may be maintained on a separate backend server.

As noted above, subscribers may be permitted to select specific delivery oprions for receiving alert notifications. Delivery options are sets of criteria that determines whether a particular alert message is to be delivered to the subscriber. Some delivery options may be based on particular properties of alert messages. Other delivery options may be based on proposed delivery time. Some of the delivery options supported by the alerts core 200, in one embodiment, may include days of week (where messages are only delivered on specific days of the week), keyword (where messages are only delivered if they contain a keyword that matches one of a set of user-entered keywords), maximum quantity of alert notifications (where alert notifications are only delivered if the subscriber has received fewer than a configured number of messages in a given day), and delivery times (where alert notifications are only delivered at specific delivery times or during specific time periods). A subscription may contain a single delivery option or several delivery options. For example, a user may select to receive alert notification on particular days of week, but such that the number of alert notifications s received in one day does not exceed a predetermined maximum.

Alert messages that are prepared for delivery by the delivery engine 222, in one embodiment, are retrieved from the channel queue component 220. The channel queue component 220, in one embodiment, defines the content provider SPI, acquires alert messages from the providers 204, associates alert messages with channels, stores messages during their validity periods in a content database, and responds to requests from other parts of the alerts core 202 for alert messages associated with a particular channel. Overall, the channel queue component 220 may be viewed as the integration point between the content providers 204 and the alerts core 202. The channel queue 220 provides a framework for writing code which communicates with content provider systems 204. The channel queue 220 may be configured to convert content feeds from the providers 204 into alert message objects, and to associate those alert message objects into channels. After the content has been acquired from providers, the channel queue 220 may serve these alert messages to other components of the alerts core 202, as well as to various extensions of the alerts core 202 (e.g., the notification service 206). The channel queue 220 may also be configured to manage the lifecycle of an alert message, e.g., according to a predetermined valididty period. Finally, the channel queue 220 may be configured to provide an administrative interface for creating, updating, and removing of content channels. The functional units of a channel queue component 300, according to one embodiment, are illustrated in FIG. 3.

Figure 3:
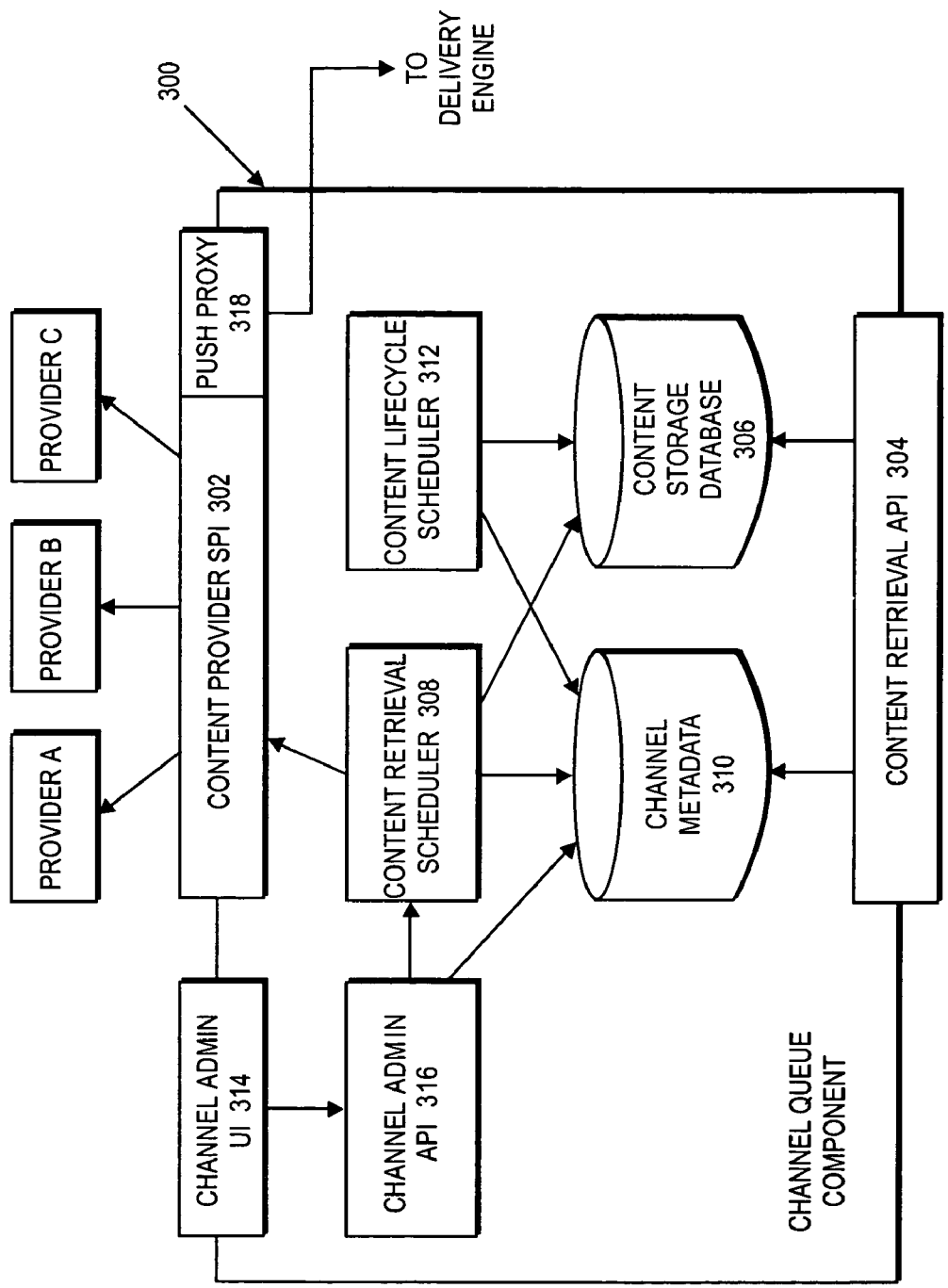
FIG. 3 illustrates a block diagram of a channel queue component, according to one embodiment of the present invention.

Referring to FIG. 3, the channel queue component 300, in one embodiment, comprises a channel queue SPI (CQ-SPI) 302 to provide interface with content providers A, B, and C, a content retrieval API 304 to retrieve provider and channel metadata and messages from channels, a content database 306 to store messages obtained from content providers, a content retrieval scheduler 308, a channel metadata database 310 to store channel metadata, a content lifecycle scheduler 312, a channel administration UI 314, a channel administration API 316, and a push proxy 318 to send content to the delivery engine 222. The content retrieval scheduler 308 may be configured to make periodic calls to registered content providers through the CQ-SPI 302 to acquire text and multimedia messages to be used in alert notifications. Once the messages are retrieved, these messages are placed in the content database 306 from which they can be served to other parts of the alerts core 202. The content retrieval scheduler 308 may be configured to run at specific times or at periodic intervals throughout the day. The timing of the scheduler is defined, in one embodiment, in a configuration file using a cron-like syntax.

As noted above, every message from content providers, that enters the alerts core 202, has an associated expiration date. The content lifecycle scheduler 312 may be configured to periodically examine the messages stored in the content database 306 and to remove those messages, for which the validity period has expired. In one embodiment, configuration information for the scheduler 308, which may use a cron-like syntax, may be stored in a configuration file associated with the scheduler 308.

The channel metadata database 310, in one embodiment, stores settings that describe content providers and channels. The information in this database is exposed to other components of the alerts core 200 through the content retrieval API 304 and may be used by the channel queue 300 to retrieve and serve messages. In one embodiment, provider metadata may include provider's name, CQ-SPI implementation, content retrieval frequency, and information on whether the provider supports a push method and a pull method. Channel metadata, in one embodiment, includes chanel name, information indicating whether the cannel is a text channel or a media channel, an associated content provider, and supported delivery options.

In one embodiment, the channel administration API 316 provides "create", "retrieve", "update", and "delete" methods for content providers and channels. This API, in one embodiment, extends the content retrieval API 304, by adding methods for writing objects returned by the content retrieval API 304. The channel administration UI 314, in one embodiment, is a web-based tool that may be used by integration engineers to manage content providers and channels. The channel administration UI 314, in one embodiment, is based on the channel administration API 316 and provides screens for adding and removing content providers and adding and removing channels for content providers.

The channel queue 300, in one embodimetnt, may act as both a client of and a server to the content providers A, B, and C. As a client of a provider, the channel queue 300 may periodically request content converts it into the internal message format, and places it in persistent storage (e.g., the content database 306). These operations may be defined by CQ-SPI 302. The CQ-SPI 302 comprises, in one embodiment, a set of Java interfaces that define means for the channel queue 300 to acquire content from providers. "Java" is a trademark of Sun Microsystems, Inc. A content retrieval scheduler 308, in one embodimetnt, calls a provider-specific implementation of the CQ-SPI 302 at predetermined times, using the CQ-SPI 302 to pull content into the alerts core system 202.

Figure 4A:
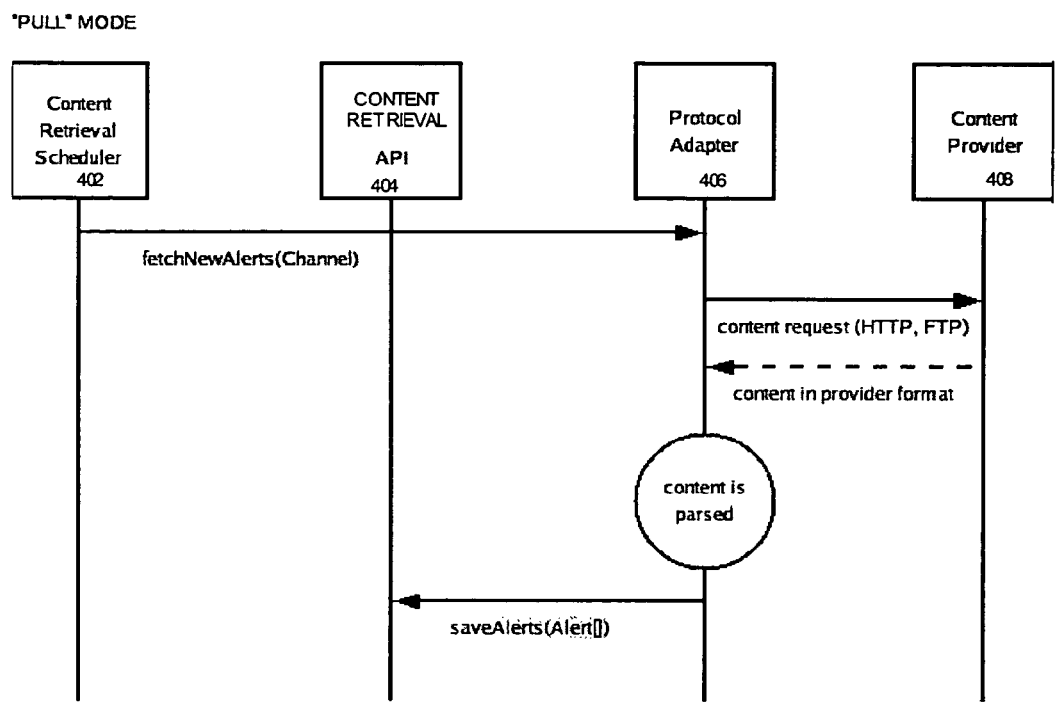
FIGS. 4A and 4B are sequence diagrams illustrating interaction between various components of a channel queue, according to one embodiment of the present invention.
Figure 4B:
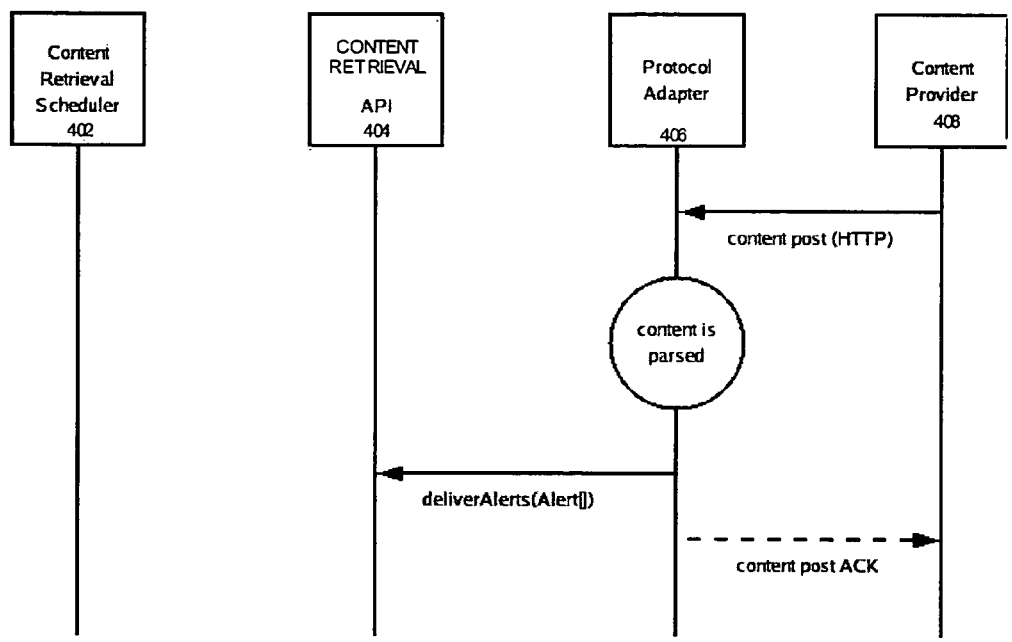

The CQ-SPI 302, in one embodiment, may include two interfaces: channel protocol adapter and channel feed parser. The channel protocol adapter defines classes that mediate interaction between a content provider and the channel queue component 300. These classes may respond to requests from the content retrieval scheduler 308 to fetch content from the provider, to place the content in the content database 306, and to place channel metadata in a channel metadata database 310. The classes defined by the channel protocol adapter may also respond to providets' requests containing content for immediate delivery. The channel protocol adapter, in one embodiment, may be responsible for communicating with a content provider using the network protocol supported by the provider. FIGS. 4A and 4B are sequence diagrams that show interaction between the protocol adapter, a provider, and various other parts of the channel queue 300.

In FIG. 4A, the channel queue 300 operates in the "pull" mode. In particular, a content retrieval scheduler 402 sends a request to the channel protocol adapter 406. The channel protocol adapter 406 may be implemented within the SPI 302 of FIG. 3). The channel protocol adapter 406 requests and receives content from a content provider 408. The received content is then parsed (e.g., utilizing a channel feed parser that associated with the SPI 302 of FIG. 3), and a command is sent to the content retrieval API 404 to save the received content.

In FIG. 4B, the channel queue 300 operates in a "push" mode. Here, the content provider posts content to the channel protocol adapter 406 associated with the SPI 302. The content is received by the channel protocol adapter 406 and parsed by the channel feed parser of the SPI 302. Finally, a command is sent to the content retrieval API 404 to deliver alert notifications containing the pushed content to eligible users, and a content post acknowledgment is sent to the content provider via the protocol adapter 406.

Figure 5:
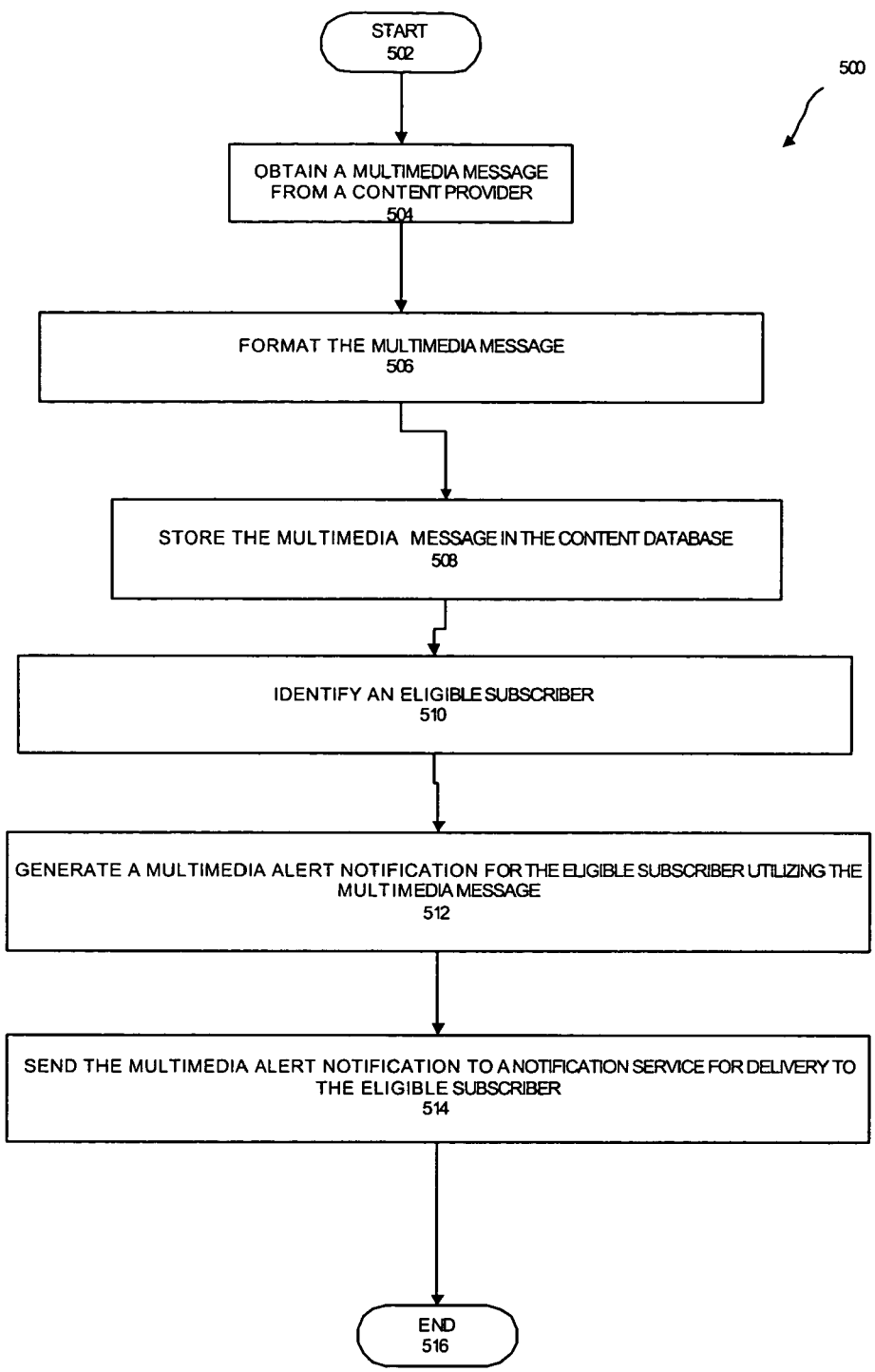
FIG. 5 is a flow chart illustrating a method for permitting a user to receive, at the user's mobile phone, multimedia alert notifications, according to one embodiment of the present invention.

FIG. 5 illustrates a flow chart of an exemplary method 500 to transfer multi media alerts to a user's mobile device such as a mobile phone. The method 500 may be performed by processing logic that may comprise hardware (e.g., dedicated logic, programmable logic, microcode, etc.), software (such as run on a general purpose computer system or a dedicated machine), or a combination of both.

Referring to FIG. 5, the method 500 commences at operation 502. At operation 504, a multimedia message is obtained from a content provider and formatted, if necessary, by the alerts core 202 at operation 506. The message is then stored by the channel queue component 300 in the content database 306 at operation 508.

At operation 510, the delivery engine 222 identifies a subscriber who is eligible to receive the message stored in the content database 306 and generates an alert notification for the eligible subscriber at operation 512. The alert notification includes the multimedia message. At operation 514, the alert notification is sent by the delivery engine 222 to the notification service 206 so that the alert notification can be delivered to the eligible subscriber. The method ends at operation 516.

Figure 6:
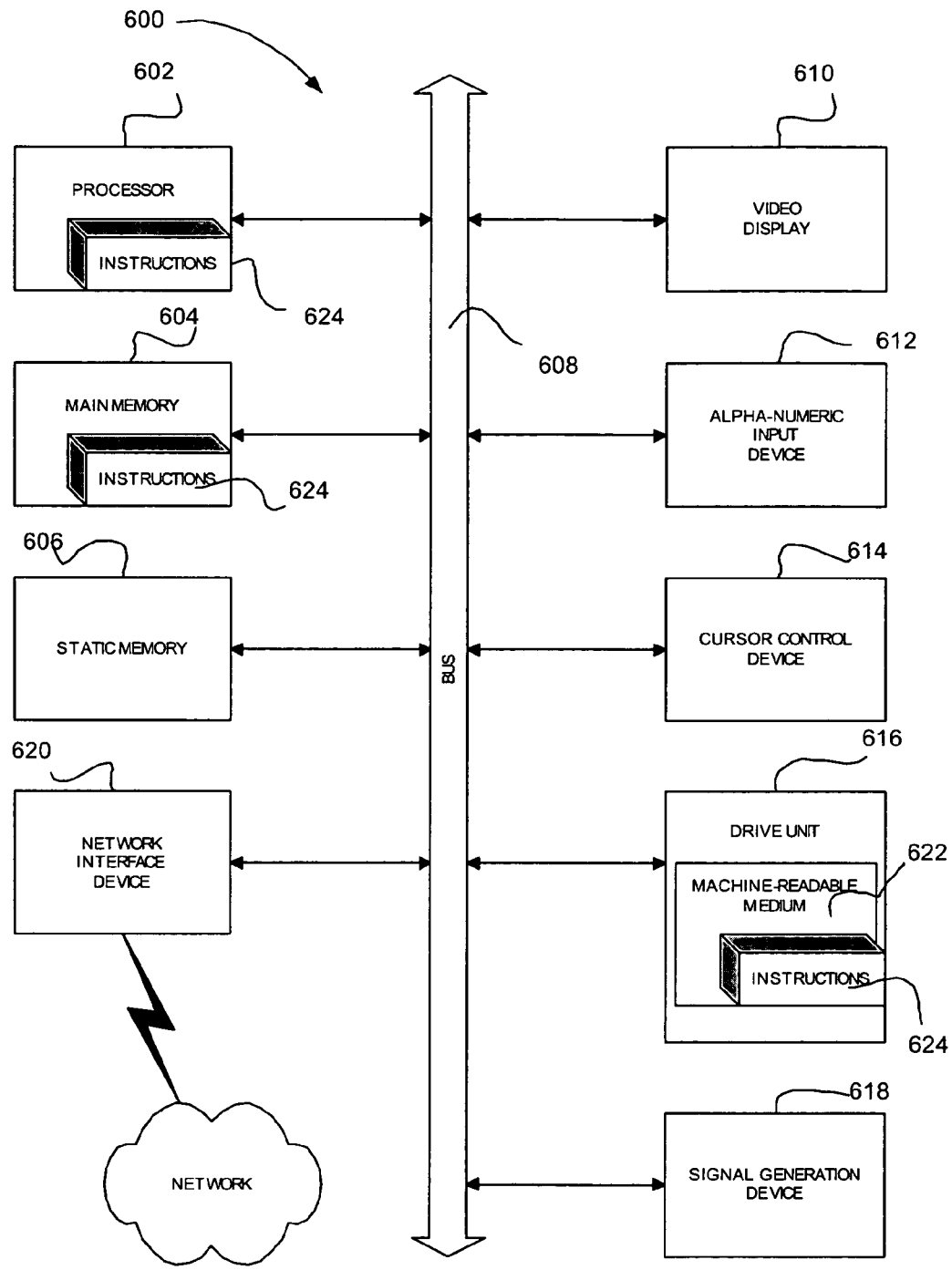
FIG. 6 is a diagrammatic representation of a computer system, within which a set of instructions, for causing the machine to perform any one or more of the methodologies discussed herein, may be executed.

FIG. 6 shows a diagrammatic representation of machine in the exemplary form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

One embodiment of the present invention may be implemented as computer software incorporated as part of a Web browser. The system operates with a computer system using a Windows™, Macintosh™, UNIX™, Linux or other operating system equipped with a Web browser application, or other Web-enabled device capable of connecting to the Internet or other network system. It should be noted that the term "Internet" is intended to encompass similar systems and nomenclature (i.e., World Wide Web or "www") comprising the capability to communicate and access information through a network, telephone connections, ISDN connections, DSL connections, cable modem, fiber optic network, etc. The present invention should not be limited in its communication nomenclature; the present invention is applicable to any system that is accessible by means of a Web browser. References herein to the "Web" are meant to refer to the World Wide Web, which is generally understood to be a user interface for the Internet, a global network of computer networks.

Thus, methods and apparatus to deliver multimedia alerts to a mobile device have been described. In the foregoing specification, the invention has been described with reference to specific embodiments. It will, however, be evident that various modifications and changes can be made without departing from the broader spirit and scope of the invention as set forth in the claims. The specification and drawings are, accordingly, to be regarded in an illustrative rather than a restrictive sense.

The invention claimed is:

1. A method to transfer content to a communication device, the method comprising:
    obtaining, at a server, a plurality of multimedia content feeds in different formats from a plurality of content providers, wherein at least one feed includes time-sensitive information and a content provider request for priority delivery of the time-sensitive information;
    parsing the multimedia content feeds based on a protocol of a feed for storage of multimedia content in a content database in an internal format;
    associating the multimedia content stored in the content database with one of a plurality of channels, wherein each channel provides related informational content obtained from a content provider from among the plurality of different content providers;
    assembling a multimedia message for the one of the plurality of channels from the multimedia content stored in the content database, including a priority multimedia message that includes the time-sensitive information;
    identifying an eligible subscriber based on a user subscription to the one of the plurality of channels;
    enqueuing the priority multimedia message for priority delivery, as requested by the content provider, to the identified eligible subscriber before delivery of the multimedia messages that do not include time-sensitive information; and
    causing an alert notification for the user subscription and containing the assembled multimedia message to be delivered to the eligible subscriber's mobile phone in response to the identifying.

2. The method of claim 1, further comprising storing the multimedia message in a content database for a validity period.

3. The method of claim 2, further comprising removing the multimedia message from the content database, responsive to expiration of the validity period.

4. The method of claim 2, wherein the validity period is a period during which the multimedia message can be delivered to the eligible subscriber's mobile phone.

5. The method of claim 1, wherein the identifying of the eligible subscriber comprises determining that the eligible subscriber has at least one unsent message in the content database.

6. The method of claim 5, wherein the causing of the alert notification containing the multimedia message to be delivered to the eligible subscriber's mobile phone comprises:
    determining that the eligible subscriber has elected to receive messages from a channel associated with the unsent message;
    determining that the eligible subscribe should be receiving the unsent message at that time, according to delivery options associated with the eligible subscriber; and
    generating the alert notification for the eligible subscriber utilizing the multimedia message.

7. The method of claim 6, wherein the causing of the alert notification containing the multimedia message to be delivered to the eligible subscriber's mobile phone further comprises sending the alert notification to a notification service for delivery to the eligible subscriber's mobile phone.

8. The method of claim 1, wherein the identifying of the eligible subscriber is performed at predetermined time intervals.

9. The method of claim 1, wherein the identifying of the eligible subscriber is performed responsive to the obtaining of the multimedia message.

10. The method of claim 1, further comprising:
    storing data in a channel metadata database that describe content providers and associated channels, the data including content provider metadata that describes an interface to be utilized by the channel metadata database for obtaining content from a corresponding content provider, and the data further includes channel metadata that describes a delivery format supported by a corresponding channel; and
    obtaining content from one of the plurality of content providers to be assembled into a multimedia message associated with a channel utilizing an interface described by content provider metadata associated with the one of the plurality of content providers; and
    delivering the multimedia message with a delivery format supported by the channel to at least one subscriber from the obtained content for the channel based on the channel metadata.

11. A system to transfer content to a communication device, the system comprising:
    a subscription service to create and store subscriptions to a plurality of channels, wherein each channel provides related informational content assembled from multimedia content received from a content provider;
    a channel queue to obtain a multimedia message associated with a channel, wherein the channel queue comprises a content provider interface to receive multimedia messages in different formats from a plurality of content providers including at least one message with time-sensitive information that is accompanied by a content provider request for priority delivery of the time-sensitive information, parse the multimedia messages based on a protocol of a multimedia message, convert the multimedia messages into an internal message format, enqueue a multimedia message with time-sensitive information for priority delivery, as requested by the content provider request, before multimedia messages that do not include time-sensitive information, and to store the multimedia messages in a content database; and
    a delivery engine to cause an alert notification for the channel to be delivered to an eligible subscriber's mobile phone.

12. The system of claim 11, wherein the channel queue comprises a content lifecycle scheduler to maintain the multimedia message in a content database for a validity period.

13. The system of claim 12, wherein the channel queue is further to remove the multimedia message from the content database, responsive to expiration of the validity period.

14. The system of claim 12, wherein the validity period is a period during which the multimedia message can be delivered to the eligible subscriber's mobile phone.

15. The system of claim 11, wherein the eligible subscriber is a subscriber to the channel and that there is at least one unsent message stored in the content database.

16. The system of claim 15, wherein the delivery engine is to:
   determine that the eligible subscriber should be receiving the unsent message at that time, according to delivery options associated with the eligible subscriber; and
   generate the alert notification the eligible subscriber utilizing the multimedia message.

17. The system of claim 11, wherein the channel queue comprises a content retrieval scheduler to make periodic requests to obtain multimedia messages from a content provider.

18. The system of claim 11, wherein the delivery engine is in communication with a notification service, the notification service being to deliver the alert notification to the eligible subscriber.

19. The system of claim 11, wherein a web application is in communication with the channel queue to permit users to subscribe to one or more channels.

20. The system of claim 11, wherein the channel is a means to group related messages from a content provider.

21. An apparatus comprising:
   means for creating and storing subscriptions to a plurality of channels, wherein each channel provides related informational content obtained from a content provider;
   means for obtaining multimedia content feeds in different formats associated with a channel from the plurality of channels at a server including at least one message with time-sensitive information and a content provider request for priority delivery of the time-sensitive information;
   means for parsing the multimedia content feeds based on a protocol of a feed for storage of multimedia content in a content database in an internal format;
   means for assembling a multimedia message for the channel from the multimedia content stored in the content database;
   means for enqueuing multimedia messages with time-sensitive information for priority delivery before multimedia messages that do not include time-sensitive information as requested by the content provider; and
   means for causing an alert notification for the channel and containing the assembled multimedia message to be delivered to an eligible subscriber's mobile phone in response to an identification of the eligible subscriber's mobile phone and the eligible subscriber's subscription to the channel.

22. A non-transitory computer readable storage medium having executable instructions stored thereon which, when executed by a machine, cause the machine to:
   create and store subscriptions to a plurality of channels, wherein each channel provides related informational content obtained from a content provider;
   obtain multimedia content feeds in different formats associated with a channel from the plurality of channels at a server including at least one message with time-sensitive information and a content provider request for priority delivery of the time-sensitive information;
   parse the multimedia content feeds based on a protocol of a feed for storage of multimedia content in a content database in an internal format;
   assemble a multimedia message for the channel from the multimedia content stored in the content database;
   enqueue multimedia messages with time-sensitive information for priority delivery before multimedia messages that do not include time-sensitive information as requested by the content provider; and
   cause an alert notification for the channel and containing the assembled multimedia message to be delivered to an eligible subscriber's mobile phone in response to an identification of the eligible subscriber's mobile phone and the eligible subscriber's subscription to the channel.

* * * * *